United States Patent
Woo et al.

(10) Patent No.: US 10,313,628 B2
(45) Date of Patent: Jun. 4, 2019

(54) APPARATUS AND METHOD FOR PROCESSING A PLURALITY OF VIDEO DATA CAPTURED BY A PLURALITY OF DEVICES

(71) Applicant: 39degrees C Inc., Seoul (KR)

(72) Inventors: Seung Won Woo, Seoul (KR); Hyun Goo Park, Seoul (KR)

(73) Assignee: 39degrees C Inc., Seoul (KR)

( * ) Notice: Subject to any disclaimer, the term of this patent is extended or adjusted under 35 U.S.C. 154(b) by 100 days.

(21) Appl. No.: 15/333,838

(22) Filed: Oct. 25, 2016

(65) Prior Publication Data
US 2018/0098025 A1   Apr. 5, 2018

(30) Foreign Application Priority Data
Oct. 4, 2016   (KR) .................. 10-2016-0127802

(51) Int. Cl.
| H04N 5/222 | (2006.01) |
| H04N 5/232 | (2006.01) |
| H04N 7/01 | (2006.01) |
| G06T 1/00 | (2006.01) |
| H04N 5/268 | (2006.01) |

(Continued)

(52) U.S. Cl.
CPC ......... *H04N 7/0127* (2013.01); *G06T 1/0021* (2013.01); *H04N 5/23206* (2013.01); *H04N 5/23293* (2013.01); *H04N 5/268* (2013.01); *H04N 21/2187* (2013.01); *H04N 21/21805* (2013.01); *H04N 21/23892* (2013.01); *H04N 21/4223* (2013.01); *H04N 21/42204* (2013.01); *H04N 21/4312* (2013.01);

(Continued)

(58) Field of Classification Search
CPC ........... H04N 21/2343; H04N 5/23293; H04N 2101/00; H04N 5/232; H04N 1/2112; H04N 5/2251; H04N 5/23206; H04N 2201/0084; H04N 5/23203; H04N 5/765; H04L 29/06489; H04L 29/06496; H04H 20/08; H04W 88/04
See application file for complete search history.

(56) References Cited

U.S. PATENT DOCUMENTS

2006/0280496 A1* 12/2006 Tanoue .............. H04N 1/00129
                                                                        396/287
2009/0136222 A1*  5/2009 Lee ........................ G03B 17/00
                                                                        396/59

(Continued)

FOREIGN PATENT DOCUMENTS

| KR | 10-1999-0050413 S | 7/1999 |
| KR | 10-2014-0073372 A | 6/2014 |

(Continued)

*Primary Examiner* — Sinh Tran
*Assistant Examiner* — Selam T Gebriel
(74) *Attorney, Agent, or Firm* — Novick, Kim & Lee, PLLC; Jae Youn Kim

(57) ABSTRACT

Provided are an image processing apparatus and method. The image processing apparatus includes a main device configured to capture a moving picture including first audio data and first video data of an object at a location, and a subdevice connected to the main device through wireless communication and including first to Nth devices configured to convert first video data of the object captured at least one location different from the location into second video data.

12 Claims, 8 Drawing Sheets

(51) Int. Cl.
*H04N 21/2389* (2011.01)
*H04N 21/422* (2011.01)
*H04N 21/8358* (2011.01)
*H04N 21/218* (2011.01)
*H04N 21/2187* (2011.01)
*H04N 21/4223* (2011.01)
*H04N 21/431* (2011.01)
*H04N 21/436* (2011.01)
*H04N 21/4402* (2011.01)

(52) U.S. Cl.
CPC ............... *H04N 21/43615* (2013.01); *H04N 21/440263* (2013.01); *H04N 21/8358* (2013.01); *H04N 7/01* (2013.01)

(56) References Cited

U.S. PATENT DOCUMENTS

| | | |
|---|---|---|
| 2015/0195601 A1 | 7/2015 | Hahm |
| 2015/0234576 A1 | 8/2015 | Bae et al. |
| 2015/0242983 A1* | 8/2015 | DiGiovanni ............ G06T 1/0021 |
| | | 382/100 |
| 2016/0142778 A1* | 5/2016 | Moribe ............ H04N 21/21805 |
| | | 725/90 |

FOREIGN PATENT DOCUMENTS

| | | |
|---|---|---|
| KR | 10-2015-0082949 A | 7/2015 |
| KR | 10-2015-0096956 A | 8/2015 |

\* cited by examiner

APPARATUS AND METHOD FOR PROCESSING A PLURALITY OF VIDEO DATA CAPTURED BY A PLURALITY OF DEVICES

CROSS-REFERENCE TO RELATED APPLICATION

This application claims the benefit of priority of Korean Patent Application No. 10-2016-0127802, filed on Oct. 4, 2016, in the Korean Intellectual Property Office, the disclosure of which is incorporated herein in its entirety by reference.

BACKGROUND

1. Field

One or more embodiments relate to an apparatus and method for processing an image.

2. Description of the Related Art

With advancements in technology, mobile devices supporting various multimedia functions have continuously evolved and been improved in terms of performance. As the performance of mobile devices has been improved, video can be compressed and transmitted in real time to an external device. Owing to the features of mobile devices that users can carry anywhere and at any time, content can be captured and transmitted in real time and thus, such mobile devices have been applied in various fields.

Information disclosed in this Background section was already known to the inventors before achieving the inventive concept or is technical information acquired in the process of achieving the inventive concept. Therefore, it may contain information that does not form the prior art that is already known to the public in this country.

SUMMARY

One or more embodiments are directed to transmitting video data and audio data captured by multiple devices to a mobile platform in real time without delay so that the mobile platform may reproduce the video data and the audio data in real time.

One or more embodiments are directed to transmitting a video signal captured by a subdevice among multiple devices to a main device without delay and without using a router.

One or more embodiments are directed to displaying video signals captured by a main device and a subdevice on a display region of the main device in real time.

Additional aspects will be set forth in part in the description which follows and, in part, will be apparent from the description, or may be learned by practice of the presented embodiments.

According to one or more embodiments, an image processing apparatus includes a main device configured to capture a moving picture including first audio data and first video data of an object at a location, and a subdevice connected to the main device through wireless communication, and including first to $N^{th}$ devices configured to convert first video data of the object, which is captured at at least one location different from the location, into second video data. The main device includes a converter configured to convert the first video data into second video data; a display controller configured to display the second video data converted from the first video data by the converter on a first display region and display at least one piece of second video data received from the subdevice on a second display region different from the first display region, wherein the second display region is divided into at least one subregion; a switch unit configured to switch the second video data displayed on a subregion selected according to a request to select one subregion to be displayed on the first display region; and a transmitter configured to transmit the second video data displayed on the first display region and the first audio data to outside.

The main device may further include an inserter configured to insert a received watermark into the second video data displayed on the first display region.

The main device may further include an encoder configured to encode the second video data displayed on the first display region and encode the first audio data. The transmitter may transmit the encoded second video data and the encoded first audio data to the outside.

The main device may further include a detector configured to detect the first to $N^{th}$ devices in a range of the wireless communication; and a setter configured to transmit a connection request signal requesting connection to the main device to the first to $N^{th}$ devices detected by the detector, and set starting of a connection between the main device and the first to $N^{th}$ devices transmitting a connection permission signal when receiving the connection permission signal from the first to $N^{th}$ devices.

When the setting of the starting of the connection is completed, the setter may generate a same shooting start signal and transmit the same shooting start signal to the main device and the first to $N^{th}$ devices transmitting the connection permission signal.

According to one or more embodiments, there is provided a method of operating an image processing apparatus, performed by a main device, wherein the image processing apparatus includes the main device configured to capture a moving picture including first audio data and first video data of an object at a location, and a subdevice connected to the main device through wireless communication and including first to $N^{th}$ devices configured to convert first video data of the object captured at at least one location different from the location into second video data. The method includes converting the first video data into second video data; displaying the second video data on a first display region and at least one piece of second video data received from the subdevice on a second display region different from the first display region, wherein the second display region is divided into at least one sub region; switching the second video data displayed on a subregion selected according to a request to select one subregion to be displayed on the first display region; and transmitting the second video data displayed on the first display region and the first audio data to outside.

The method may further include inserting a received watermark into the second video data displayed on the first display region.

The method may further include encoding the second video data displayed on the first display region and encoding the first audio data. The transmitting of the second video data and the first audio data to the outside may include transmitting the encoded second video data and the encoded first audio data to the outside.

The method may further include detecting the first to $N^{th}$ devices in a radius of the wireless communication; transmitting a connection request signal requesting connection to the main device to the detected first to $N^{th}$ devices; receiving a connection permission signal from the first to N$^{th}$ devices; and setting starting connection to the first to N$^{th}$ devices transmitting the connection permission signal.

When the setting of the starting of the connection is completed, the method may further include generating a same shooting start signal and transmitting the same shooting start signal to the main device and the first to N$^{th}$ devices transmitting the connection permission signal.

According to one or more embodiments, there are provided other methods, systems, and a computer program configured to perform the methods.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
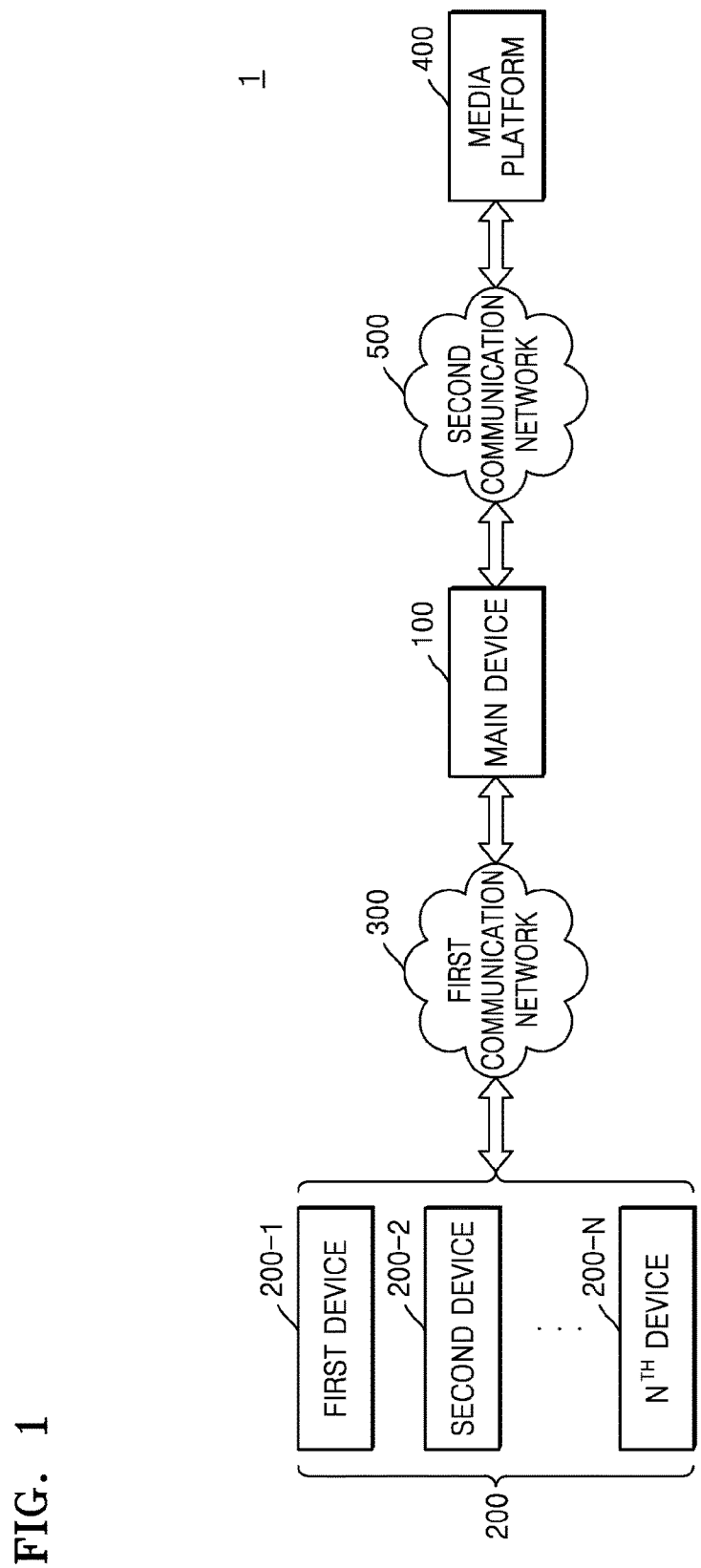
FIG. 1 is a diagram schematically illustrating an image processing system according to an embodiment of the inventive concept.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The advantages and features of the inventive concept and a method of achieving them would be apparent from the following embodiments in conjunction with the accompanying drawings. However, the inventive concept is not limited to these embodiments, and may be embodied in many different forms and should be understood to cover all modifications, equivalents, and alternatives falling within the scope of the inventive concept. The following embodiments are provided so that this disclosure will be thorough and complete and will fully convey the inventive concept to those of ordinary skill in the art. In the following description, well-known technologies are not described in detail if it is determined that they would obscure the inventive concept due to unnecessary detail.

The terminology used herein is for the purpose of describing particular embodiments only and is not intended to be limiting of the inventive concept. As used herein, the singular forms 'a', 'an' and 'the' are intended to include the plural forms as well, unless the context clearly indicates otherwise. It will be further understood that the terms 'comprise' and/or 'comprising,' when used in this specification, specify the presence of stated features, integers, steps, operations, elements, and/or components, but do not preclude the presence or addition of one or more other features, integers, steps, operations, elements, components, and/or groups thereof. It will be understood that, although the terms 'first', 'second', 'third', etc., may be used herein to describe various elements, these elements should not be limited by these terms. These terms are only used to distinguish one element from another element.

In the present disclosure, the term 'main device' (see reference numeral '100' of FIG. 1) should be understood to include a terminal having a function of capturing moving pictures, including video data and audio data. Examples of the main device may include a mobile device manipulated by a user, such as a notebook computer, a handheld device, a smart phone, a tablet personal computer (PC), etc., a desktop computer, and any appropriate device using such a device or connected directly or indirectly to such a device. However, the main device is not limited thereto and any terminal having a web browsing function and a video capturing function may be employed as the main device without limitation. In the following embodiments, the main device may be, for example, a mobile terminal capable of running a real-time video relaying application. The main device may serve as a repeater which transmits an image captured by the main device itself and/or an image received from a subdevice to a media platform.

In the present disclosure, the term 'subdevice' (see reference numeral '200' of FIG. 1) should be understood to include at least one terminal connected to the main device and having a function of capturing moving pictures, including video data and audio data. The subdevice may transmit video data converted into a predetermined format to the main device. Examples of the subdevice may include a mobile device manipulated by a user, such as a notebook computer, a handheld device, a smart phone, a tablet PC, etc., a desktop computer, and any appropriate device using such a device or connected directly or indirectly to such a device. However, the subdevice is not limited thereto and any terminal having a web browsing function and a video capturing function as described above may be employed as the subdevice without limitation. In the following embodiments, the subdevice may be, for example, a mobile terminal capable of running a real-time video relaying application.

Hereinafter, embodiments of the inventive concept will be described in detail with reference to the accompanying drawings, in which the same elements or corresponding elements are assigned the same reference numerals and are not redundantly described here.

FIG. 1 is a diagram schematically illustrating an image processing system 1 according to an embodiment of the inventive concept. Referring to FIG. 1, the image processing system 1 may include a main device 100, a subdevice 200, a first communication network 300, a media platform 400, and a second communication network 500. The subdevice 200 may include a first device 200-1 to an N$^{th}$ device 200-N.

The main device 100 may detect the first to N$^{th}$ devices 200-1 to 200-N included in the subdevice 200 which is in a range of communication of the first communication network 300, and transmit a signal requesting connection to the main device 100 to the detected first to N$^{th}$ devices 200-1 to 200-N. When receiving a signal permitting connection to the main device 100 from one of the first to N$^{th}$ devices 200-1 to 200-N, the main device 100 may start connection to the device transmitting the signal permitting connection to the main device 100. Here, the main device 100 may set the media platform 400 as an external device to which a moving picture (including second video data and first audio data) is transmitted in real time during the detecting of the first to $N^{th}$ devices 200-1 to 200-N or while starting the connection. When the main device 100 completes the starting of the connection, a shooting start signal is generated and transmitted to the first to $N^{th}$ devices 200-1 to 200-N. Thus, a same shooting start time may be recorded on the main device 100 and the first to $N^{th}$ devices 200-1 to 200-N.

The main device 100 may capture moving pictures of an object, including first audio data and first video data, at a predetermined location in real time. The first video data may be captured by a charge-coupled device (CCD) (not shown) and the first audio data may be recorded by an internal microphone (not shown).

The main device 100 may convert the first video data captured in real time into the second video data. Here, the first video data may be raw data which is non-processed data containing data processed to a minimum level by a CCD (not shown) included in the main device 100. In general, the raw data is not compressed or is losslessly compressed, and white balance, brightness, tone, chroma, etc. of the raw data are not determined. The raw data includes only information sensed by an image sensor. The second video data may include video data obtained by converting the first video data into a predetermined format. The second video data may include a bitmap format. Here, the second video data is not limited to the bitmap format, and may include an image format such as a joint photographic expert group (JPEG) format, a graphics interchange format (GIF), a portable network graphics (PNG) format, or the like.

The main device 100 may display the second video data converted from the first video data by the main device 100 itself on a first display region, and display one or more pieces of second video data received from the subdevice 200 on a second display region. The second display region is different from the first display region and is divided into one or more subregions. In general, the main device 100 encodes and decodes the first video data and the first audio data transmitted from the subdevice 200 and displays a result of encoding and decoding the first video data and the first audio data on a display region. Thus, it takes time to encode and decode the first video data and the first audio data. This time may be a major cause of delays in real-time broadcasting. Furthermore, moving pictures cannot be reproduced in real time by the media platform 400 due to this time. However, in the present embodiment, the second video data is received from the subdevice 200 and displayed on the second display region without being encoded and decoded. Thus, moving pictures may be processed in real time and be thus reproduced in real time by the media platform 400.

The main device 100 may switch the second video data, which is received from the subdevice 200 and displayed on a subregion selected according to a request to select one subregion, to be displayed on the first display region. Thus, the second video data captured by the main device 100 or the second video data received from the subdevice 200 may be displayed on the first display region. Furthermore, both the second video data displayed on the first display region and the second video data displayed on the second display region may include video data captured in real time and converted.

The main device 100 may insert a watermark received from a user into the second video data displayed on the first display region. Here, the watermark may include various graphic elements such as an image, subtitles, a visual effect, etc. The main device 100 may provide an additional user interface to insert the watermark into the first display region.

The main device 100 may encode the second video data displayed on the first display region and the first audio data. The main device 100 may transmit a moving picture, including the encoded second video data and first audio data, to the media platform 400 which is an external device. Here, the main device 100 may transmit the encoded second video data and first audio data to the media platform 400 according to a real time messaging protocol (RTMP) which is a communication protocol.

The subdevice 200 may be connected to the main device 100 via the first communication network 300, and may capture a moving picture of an object, which includes first audio data and first video data, in real time at at least one location which is the same as or different from a location where the main device 100 photographs the object.

The subdevice 200 may communicate with the main device 100 within a range of communication of the first communication network 300, transmit a connection permitting message to the main device 100 when receiving a connection request signal from the main device 100, and start capturing a moving picture when receiving a shooting start signal from the main device 100.

The subdevice 200 may convert first video data of a captured moving picture into second video data and transmit the second video data to the main device 100. Here, first audio data recorded by the subdevice 200 is not transmitted to the main device 100, and only the second video data may be transmitted to the main device 100.

The first communication network 300 may enable exchange of data between the main device 100 and the subdevice 200. The first communication network 300 may be understood as a communication network providing a connection path to exchange data between the main device 100 and the subdevice 200 when the main device 100 and the subdevice 200 are connected to each other. Here, the first communication network 300 may include Wi-Fi direct. Wi-Fi direct may be understood as a communication network whereby device-to-device communication may be established between the main device 100 and the subdevice 200 even when not part of a home network, an office network, or a hotspot network. When Wi-Fi direct is used, communication may be established between the main device 100 and the subdevice 200 without using a router. In this case, a communication radius may be about 70 meters.

In general, a wireless local area network (LAN) mainly handles an operation of an infrastructure basic service set (BSS) in which a router serves as a hub. The router performs a function of supporting a physical layer for wireless/wired connection, a function of routing devices in a network, a function of providing a service to add a device to or remove a device from a network, etc. In this case, the devices in the network are connected to each other via the router without being directly connected to each other. However, in the present embodiment, communication may be directly established between the main device 100 and the subdevice 200 through Wi-Fi direct without using a router.

The media platform 400 may receive a moving picture (including second video data and first audio data) from the main device 100 via the second communication network 500, and reproduce the moving picture in real time. The media platform 400 may include, for example, a system providing a social network service (SNS) site where moving picture content is shared, e.g., Africa TV, YouTube, Facebook, etc.

The second communication network 500 connects the main device 100 and the media platform 400 to each other. That is, the second communication network 500 means a communication network providing a connection path in which the main device 100 is connected to the media platform 400 to transmit data to or receive data from the media platform 400. Examples of the second communication network 500 include wired networks such as LANs, Wide Area Networks (WANs), Metropolitan Area Networks (MANs), Integrated Service Digital Networks (ISDNs), etc., or wireless networks such as wireless LANs, CDMA, Bluetooth, satellite communication, etc., but the scope of the inventive concept is not limited thereto. In the present embodiment, the first communication network 300 and the second communication network 500 are differently embodied but the second communication network 500 may include the first communication network 300.

Figure 2:
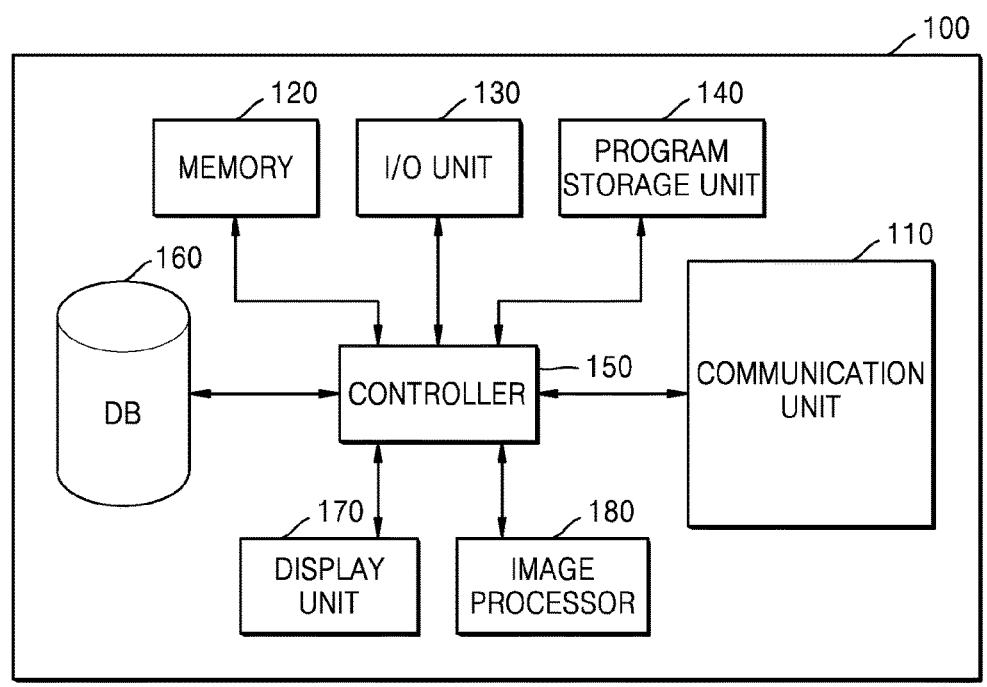
FIG. 2 is a schematic block diagram of a structure of a main device included in the image processing system of FIG. 1.

FIG. 2 is a schematic block diagram of a structure of the main device 100 included in the image processing system 1 of FIG. 1. Referring to FIG. 2, the main device 100 may include a communication unit 110, a memory 120, an input/output (I/O) unit 130, a program storage unit 140, a controller 150, a database 160, a display unit 170, and an image processor 180.

The communication unit 110 may provide a communication interface needed to provide, in the form of packet data, a signal to be exchanged between the main device 100 and the subdevice 200 while being linked to the first communication network 300. The communication unit 110 may transmit a connection request signal to the first to $N^{th}$ devices 200-1 to 200-N included in the subdevice 200 which is within a first communication radius, receive a connection permission signal from the first to $N^{th}$ devices 200-1 to 200-N, generate a shooting start signal and transmit it to the first to $N^{th}$ devices 200-1 to 200-N, and receive second video data from the first to $N^{th}$ devices 200-1 to 200-N.

Furthermore, the communication unit 110 may provide a communication interface needed to provide, in the form of packet data, a signal to be exchanged between the main device 100 and the media platform 400 while being linked to the second communication network 500. The communication unit 110 may be connected to the media platform 400 to transmit the second video data and first audio data to the media platform 400 in real time.

The communication unit 110 may be a device including hardware and software needed to connect the communication unit 110 to another network device so as to transmit a signal, such as a control signal or a data signal, to the other network device or receive the signal from the other network device.

The memory 120 performs a function of temporarily or permanently storing data processed by the controller 150. In the present embodiment, the memory 120 may store second video data received from the subdevice 200, and a moving picture (including first video data and first audio data) captured by the main device 100. Here, the memory 120 may include a magnetic storage medium or a flash storage medium but the scope of the inventive concept is not limited thereto.

The I/O unit 130 may be embodied as a touch recognition display controller or other various I/O controllers. For example, the touch recognition display controller may provide an output interface and an input interface between a device and a user. The touch recognition display controller may transmit an electrical signal to or receive it from the controller 150. Furthermore, the touch recognition display controller may display a visual output and/or an audio output to a user. The visual output may include text, graphics, an image, video, or a combination thereof. The audio output may include audio which is in synchronization with the visual output. The I/O unit 130 may be, for example, a display member having a touch recognition function, such as an organic light-emitting display (OLED) or a liquid crystal display (LCD).

The program storage unit 140 includes control software for performing detecting of the subdevice 200 in a first wireless communication environment, transmitting a connection request signal to the subdevice 200, receiving the connection permission signal from the subdevice 200, transmitting a shooting start signal to the subdevice 200, receiving a second video signal from the subdevice 200, converting the first video data captured by the main device 100 into second video data, displaying on a display region the second video data and second video data received from the subdevice 200, inserting a watermark into the second video data and the first audio data, encoding the second video data and the first audio data, transmitting the second video data and the first audio data to the media platform 400, etc.

The controller 150 is a type of central processing unit (CPU), and may control a whole process of transmitting, to the media platform 400, either the second video data received from the subdevice 200 or the second video data converted from the first video data included in the moving picture captured by the main device 100, and the first audio data included in the moving picture captured by the main device 100. As described above, the controller 150 may control a whole processing process related to exchange of data among the main device 100, the subdevice 200, and the media platform 400.

The database 160 may include information regarding a user and a device using the main device 100 and the subdevice 200 in relation to a real-time video relaying application installed in the main device 100 and the subdevice 200.

The display unit 170 may reproduce the moving picture which is being captured by the main device 100, i.e., the, first video data and the first audio data. The display unit 170 may be, for example, a display member having a touch recognition function such as an OLED or an LCD. The display unit 170 may include a first display region and a second display region. The second video data received from the subdevice 200 may be displayed on the second display region. The second display region may be divided into one or more subregions. The number of the one or more subregions may be the same as the number of the first to $N^{th}$ devices 200-1 to 200-N which transmit the connection permission signal. The display unit 170 may display a user interface on the second video data displayed on the first display region, through which a watermark may be inserted, and may display on the first display region a status of inserting the watermark.

The image processor 180 may start connection to the subdevice 200 by detecting the first to $N^{th}$ devices 200-1 to 200-N included in the subdevice 200 which is in a communication radius of the first communication network 300. The image processor 180 may capture a moving picture (including first audio data and first video data) of an object at a location in real time, and convert the first video data into second video data. The image processor 180 may display the second video data converted from the first video data on the first display region, and display one or more pieces of second video data received from the subdevice 200 on the second display region which is different from the first display region and which is divided into one or more subregions. The image processor 180 may switch the second video data, which is received from the subdevice 200 and displayed on a subregion selected according to a request to select one subregion, to be displayed on the first display region. The image processor 180 may insert a watermark received from a user into the second video data displayed on the first display region. The image processor 180 may encode the second video data displayed on the first display region and the first audio data, and transmit a moving picture including the encoded second video data and first audio data to the media platform 400 according to the RTMP.

Figure 3:
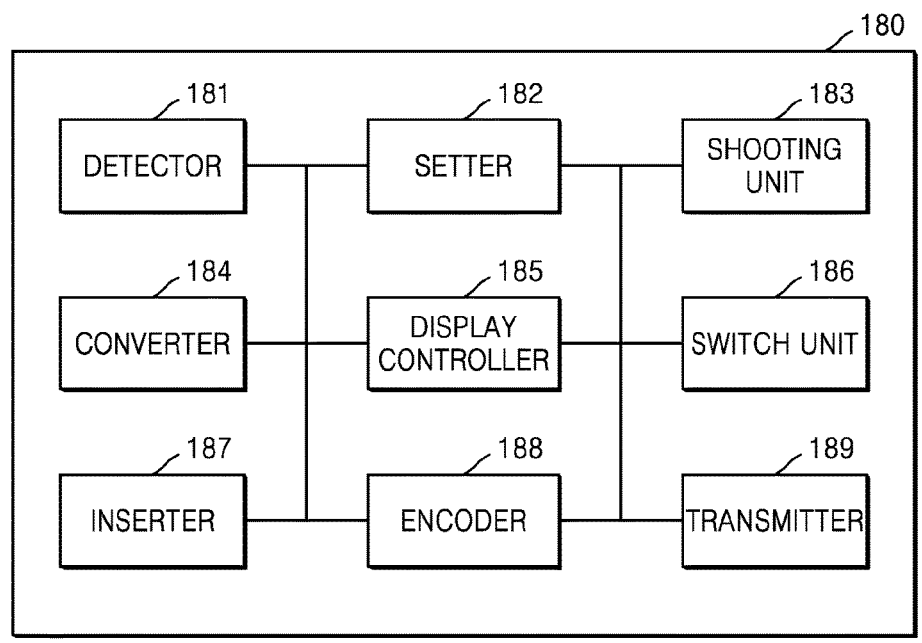
FIG. 3 is a schematic block diagram of a structure of an image processor included in the main device of FIG. 2.

FIG. 3 is a schematic block diagram of a structure of the image processor 180 included in the main device 100 of FIG. 2. Referring to FIG. 3, the image processor 180 may include a detector 181, a setter 182, a shooting unit 183, a converter 184, a display controller 185, a switch unit 186, an inserter 187, an encoder 188, and a transmitter 189.

The detector 181 may detect the first to $N^{th}$ devices 200-1 to 200-N included in the subdevice 200 which is in the communication radius of the first communication network 300 and output a result of detecting the first to $N^{th}$ devices 200-1 to 200-N included in the subdevice 200 to the display unit 170 according to a detection request signal received from a user's subdevice 200.

The setter 182 may check the result of detecting the first to $N^{th}$ devices 200-1 to 200-N included in the subdevice 200, select at least one among the first to $N^{th}$ devices 200-1 to 200-N, and transmit a connection request signal requesting connection to the main device 100 to the at least one selected device. When receiving a connection permission signal from the at least one selected device to which the connection request signal is transmitted, the setter 182 may display the at least one selected device transmitting the connection permission signal on the display unit 170, and start connection to the main device 100 according to a selection signal with respect to the at least one selected device.

The setter 182 may set the media platform 400 as an external device to which a moving picture (including second video data and first audio data) is to be transmitted during the detecting of the first to $N^{th}$ devices 200-1 to 200-N included in the subdevice 200 or the starting of the connection to the main device 100. When the setter 182 completes setting of the starting of the connection to the main device 100, a shooting start signal may be generated and transmitted to the first to $N^{th}$ devices 200-1 to 200-N and thus the same shooting start time may be recorded on the main device 100 and the first to $N^{th}$ devices 200-1 to 200-N.

Although not shown, the shooting unit 183 may include a shutter, a series of lenses, an iris, a CCD, an analog-to-digital converter (ADC), a microphone, etc. The shooting unit 183 may capture, from light input through a shutter, a moving picture (including first audio data and first video data) of an object at a location in real time. The shooting unit 183 may capture the first video data by using the CCD and record the first audio data by using the microphone.

The converter 184 may convert first video data captured in real time into second video data. Furthermore, the converter 184 may generate second video data by converting a frame rate and/or resolution of the second video data according to a control signal.

The display controller 185 may display on the display unit 170 the second video data converted from the first video data by the converter 184 and one or more pieces of second video data received in real time from the first to $N^{th}$ devices 200-1 to 200-N included in the subdevice 200.

Figure 4:
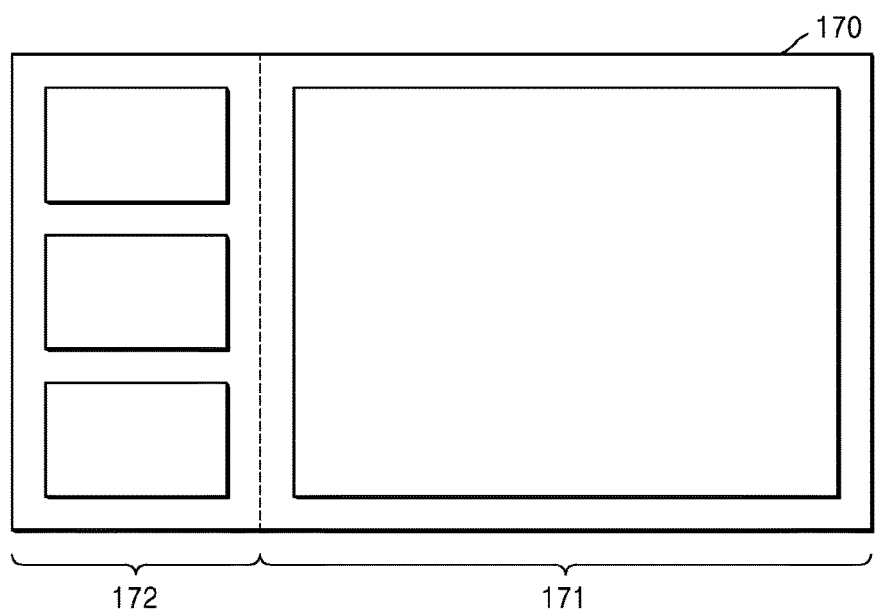
FIG. 4 is a diagram schematically illustrating a structure of a display unit included in the main device of FIG. 1.

FIG. 4 illustrates a structure of the display unit 170. Referring to FIG. 4, the display unit 170 may include a first display region 171 and a second display region 172. Here, the second display region 172 is divided into a plurality of subregions. The number of the plurality of subregions may be equal to that of the first to $N^{th}$ devices 200-1 to 200-N starting connection to the main device 100. The second display region 172 may be divided into the plurality of subregions at a point of time when a connection between the main device 100 and the first to $N^{th}$ devices 200-1 to 200-N is started by the display controller 185.

The display controller 185 may display the second video data converted from the first video data by the converter 184 on the first display region 171, and second video data received from the first to $N^{th}$ devices 200-1 to 200-N on the plurality of subsections of the second display region 172. Here, the second video signal displayed on the first display region 171 may be transmitted in real time to the media platform 400. A frame rate of the second video signal displayed on the first display region 171 may be different from that of the second video data displayed on each of the plurality of subregions of the second display region 172. For example, second video data of 30 frames per second may be displayed on the first display region 171, and second video data of 15 frames per second may be displayed on each of the plurality of subregions of the second display region 172. As illustrated in FIG. 4, since each of the plurality of subregions of the second display region 172 is smaller in size than the first display region 171, second video data of a lower frame rate may be displayed on each of the plurality of subregions of the second display region 172.

Since second video data received from the first to $N^{th}$ devices 200-1 to 200-N in real time is displayed on each of the plurality of subregions of the second display region 172, the display controller 185 may control the main device 100 to display a second video signal of 30 frames per second on the first display region 171 and control the first to $N^{th}$ devices 200-1 to 200-N to display a second video signal of 15 frames per second, simultaneously with transmission of a shooting start signal to the first to $N^{th}$ devices 200-1 to 200-N. Thus, the second video signal of 15 frames per second received from the first to $N^{th}$ devices 200-1 to 200-N may be displayed on each of the plurality of subregions of the second display region 172.

Although the second video data displayed on the first display region 171 and the second video data displayed on each of the plurality of subregions of the second display region 172 are different from each other in terms of frame rate in the present embodiment, they may be different from each other in terms of resolution rather than frame rate. For example, the display controller 185 may display second video data having resolution of 1280×720 on the first display region 171, and second video data having resolution of 640×480 on each of the plurality of subregions of the second display region 172.

The switch unit 186 may switch the second video data, which is displayed on a subregion selected according to a request to select one subregion, received from a user, to be displayed on the first display region 171, in a state in which the second video data converted from the first video data by the converter 184 is displayed on the first display region 171 and the second video data received from the first to $N^{th}$ devices 200-1 to 200-N is displayed on each of the plurality of subregions of the second display region 172.

Here, when the second video data displayed on the subregion is switched to be displayed on the first display region 171, the switch unit 186 may transmit a control signal instructing to transmit second video data having a different frame rate to one of the first to $N^{th}$ devices 200-1 to 200-N which transmit the second video data to the plurality of subregions. That is, the switch unit 186 may transmit a control signal instructing to transmit second video data having a frame rate of 30 frames per second to one of the first to $N^{th}$ devices 200-1 to 200-N that transmitted second video data having a frame rate of 15 frames per second at a time of point when a subregion is selected.

Furthermore, the switch unit 186 switches second video data previously displayed on the first display region 171 to be displayed on one of the plurality of subregions of the second display region 172. In this case, the switch unit 186 may output a control signal instructing to output the second video data having a frame rate of 30 frames per second to be transmitted at a frame rate of 15 frames per second.

The inserter 187 may provide a user interface for inserting a watermark into second video data in a state in which the second video data is displayed on the first display region 171, and insert the watermark into the second video data displayed on the first display region 171 according to a user's selection. Here, the watermark may include various graphic elements such as an image, subtitles, a visual effect, etc.

The encoder 188 may encode the second video data displayed on the first display region 171 into a H.264 format and encode first audio data by using advanced audio coding (AAC). Here, even if only second video data is received from the subdevice 200 and displayed on the first display region 171, the same shooting start signal is recorded on the main device 100 and the subdevice 200. Thus, the second video data received from the subdevice 200 and the first audio data recorded by the main device 100 may be synchronous or almost synchronous with each other.

The transmitter 189 transmits encoded second video data displayed on the first display region 171 and encoded first audio data to the media platform 400 via the second communication network 500 using the RTMP. Thus, the media platform 400 may reproduce a moving picture (including the second video data and the first audio data) transmitted in real time from the main device 100.

Figure 5:
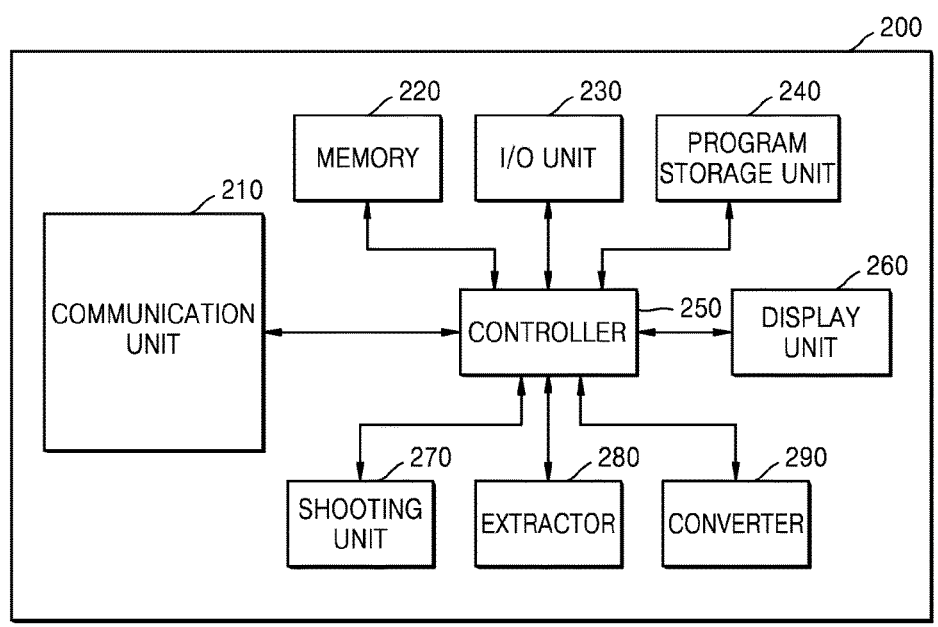
FIG. 5 is a schematic block diagram of a structure of a subdevice included in the image processing system of FIG. 1.

FIG. 5 is a schematic block diagram of a structure of the subdevice 200 included in the image processing system 1 of FIG. 1. Referring to FIG. 5, each of the first to $N^{th}$ devices 200-1 to 200-N included in the subdevice 200 may include a communication unit 210, a memory 220, an I/O unit 230, a program storage unit 240, a controller 250, a display unit 260, a shooting unit 270, an extractor 280, and a converter 290.

The communication unit 210 may provide a communication interface needed to provide, in the form of packet data, a signal to be exchanged between the main device 100 and the subdevice 200 while being linked to the first communication network 300. The communication unit 210 may receive a connection request signal from the main device 100, transmit a connection permission signal to the main device 100, receive a shooting start signal from the main device 100, transmit second video data to the main device 100, and transmit the second video data, the frame rate of which is converted, according to a request from the main device 100.

The communication unit 210 may be a device including hardware and software needed to connect another network device via wire or wirelessly so as to transmit a signal, such as a control signal or a data signal, to or receive the signal from the network device.

The memory 220 performs a function of temporarily or permanently storing data processed by the controller 250. In the present embodiment, the memory 220 may store a moving picture (including first video data and first audio data) captured by the subdevice 200. Here, the memory 220 may include a magnetic storage medium or a flash storage medium but the scope of the inventive concept is not limited thereto.

The I/O unit 230 may be embodied as a touch recognition display controller or any of other various I/O controllers. For example, the touch recognition display controller may provide an output interface and an input interface between a device and a user. The touch recognition display controller may transmit an electrical signal to or receive it from the controller 250. Furthermore, the touch recognition display controller displays a visual output and/or an audio output to a user. The visual output may include text, graphics, an image, video, or a combination thereof. The audio output may include audio in synchronization with the visual output. The I/O unit 130 may be, for example, a display member having a touch recognition function, such as an OLED or an LCD.

The program storage unit 240 includes control software for generating the connection permission signal and transmitting it according to the connection request signal from the main device 100, capturing a moving picture including first video data and first audio data according to a shooting start signal from the main device 100, converting the first video data included in the moving picture into second video data, converting a frame rate of the second video data according to a request from the main device 100, and so on.

The controller 250 is a type of CPU and may control a whole process of converting first video data included in a captured moving picture into second video data and transmitting the second video data to the main device 100. As described above, the controller 250 may control a whole processing process related to the exchange of data between the main device 100 and the subdevice 200.

The display unit 260 may reproduce a moving picture which is being captured by the subdevice 200, i.e., first video data and first audio data. Here, the display unit 260 may be, for example, a display member having a touch recognition function, such as an OLED or an LCD.

Although not shown, the shooting unit 270 may include a shutter, a series of lenses, an iris, a CCD, an ADC, a microphone, etc. The shooting unit 270 may capture, from light input through a shutter, a moving picture (including first audio data and first video data) of an object in real time at a location, which is the same as or different from a location where an object is captured by the main device 100. The shooting unit 270 may capture the first video data by using the CCD and record the first audio data by using the microphone. The moving picture captured by the shooting unit 270 may be displayed on the display unit 260.

The extractor 280 may extract the first video data from the moving picture (including the first video data and first audio data) captured by the shooting unit 270, and the converter 290 may convert the first video data into second video data. Here, the converter 290 may generate second video data by converting a frame rate and/or resolution of the second video data according to a request from the main device 100. The second video data converted from the first video data by the converter 290 may be transmitted to the main device 100 via the communication unit 210 and the first communication network 300. Here, the second video data which is first transmitted to the main device 100 may have a frame rate of 15 frames per second, and may be converted into second video data having a frame rate of 30 frames per second according to the request from the main device 100 and be then transmitted to the main device 100.

Figure 6:
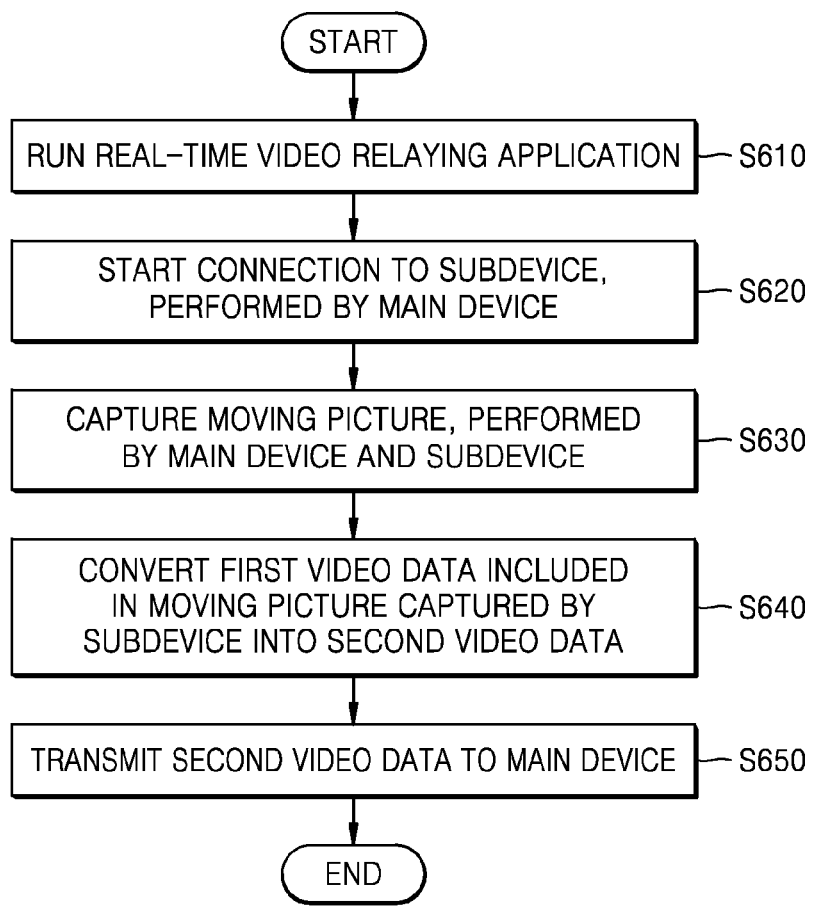
FIGS. 6 to 8 are flowcharts of image processing methods according to embodiments of the inventive concept.

FIG. 6 is a flowchart of an image processing method according to one embodiment of the inventive concept. In the following description, parts of the image processing method of FIG. 6 which are the same as those described above with reference to FIGS. 1 to 5 are not redundantly described here. FIG. 6 illustrates an image processing method in which data is transmitted and received between the main device 100 and the subdevice 200 via the first communication network 300, and the method is described below in terms of the subdevice 200.

Referring to FIG. 6, the main device 100 and the subdevice 200 run a real-time video relaying application according to a user's selection (operation S610).

When the running of the real-time video relaying application is completed, the main device 100 starts connection to the subdevice 200 (operation S620).

Figure 7:
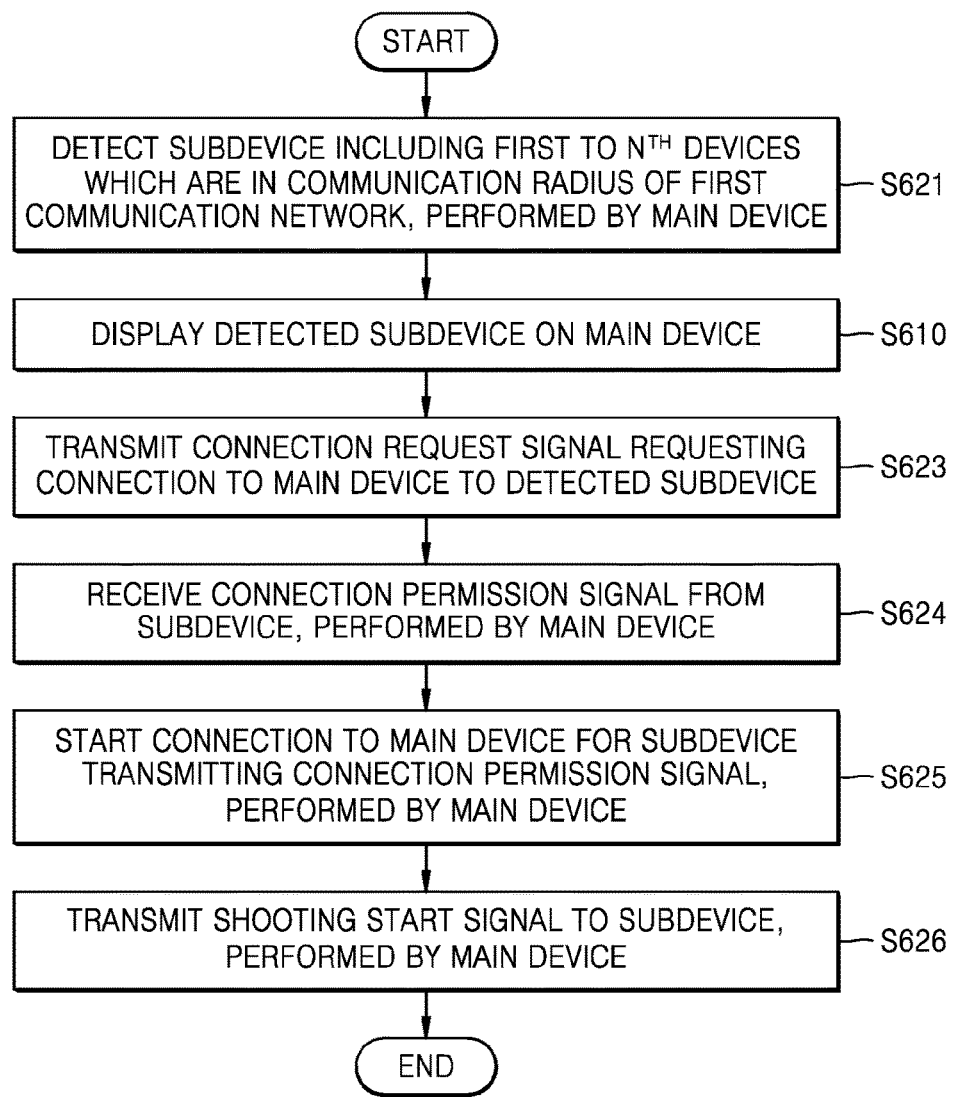

FIG. 7 is a flowchart of a method of starting connection to the subdevice 200 according to one embodiment of the inventive concept, performed by the main device 100. Referring to FIG. 7, the main device 100 detects the first to $N^{th}$ devices 200-1 to 200-N included in the subdevice 200 which is in a communication radius of the first communication network 300 (operation S621).

The detected first to $N^{th}$ devices 200-1 to 200-N included in the subdevice 200 are displayed on the main device 100 (operation S622).

The main device 100 selects at least one device among the first to $N^{th}$ devices 200-1 to 200-N from a result of detecting the first to $N^{th}$ devices 200-1 to 200-N, and transmits a connection request signal requesting connection to the main device 100 to the at least one device (operation S623).

The main device 100 receives a connection permission signal from the at least one device to which the connection request signal is transmitted (operation S624).

The main device 100 sets connection to the main device 100 for the at least one device transmitting the connection permission signal (operation S625).

When the setting of the connection to the main device 100 is completed, the main device 100 generates a shooting start signal and transmits it to the at least one device (operation S626). Thus, same shooting start time may be recorded on the main device 100 and the at least one device.

The main device 100 may set the media platform 400 as an external device to which a moving picture (including second video data and first audio data) is to be transmitted in real time during one of operations S621 to S626 described above.

Referring back to FIG. 6, when shooting begins, each of the main device 100 and the subdevice 200 captures a moving picture in real time (operation S630). The main device 100 may capture a moving picture (including first audio data and first video data) of an object at a location in real time. The subdevice 200 may capture a moving picture (including first audio data and first video data) of the object in real time at a location which is the same as or different from the location where the main device 100 captures the moving picture of the object.

The subdevice 200 converts the first video data included in the moving picture into second video data (operation S640). Here, the first video data may be raw data which is non-processed data containing data processed to a minimum level by a CCD (not shown) included in the subdevice 200. The second video data is video data obtained by converting the first video data into a predetermined format, and may contain, for example, a bitmap format. Here, the second video data is not limited to the bitmap format, and may include an image format such as a JPEG format, a GIF, a PNG format, or the like.

The subdevice 200 transmits the second video data to the main device via the first communication network 300 (operation S650). The second video data which is first transmitted from the subdevice 200 to the main device 100 may have, for example, a frame rate of 15 frames per second, and may be converted into second video data having a frame rate of 30 frames per second and be then transmitted to the main device 100 according to a request from the main device 100.

Figure 8:
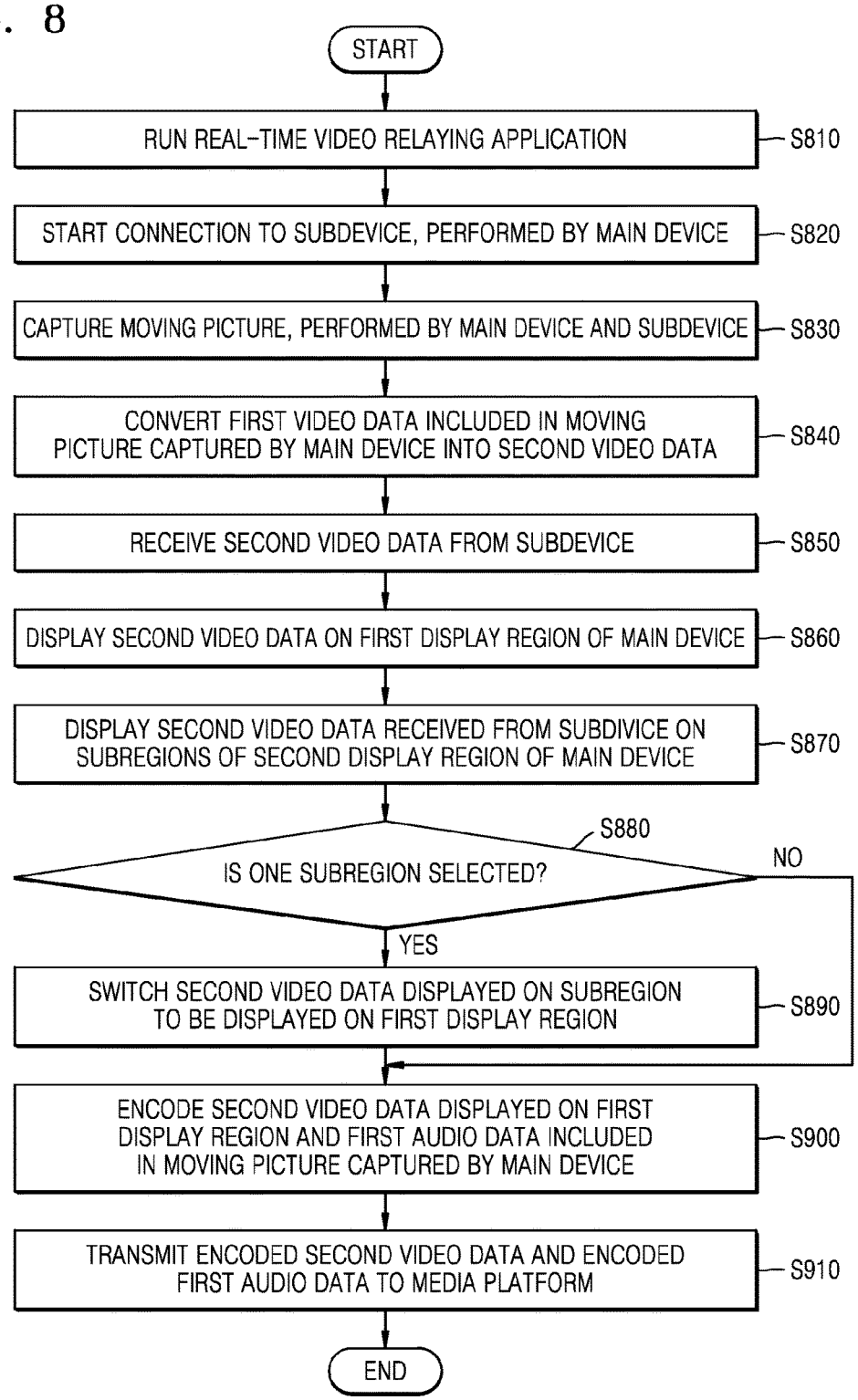

FIG. 8 is a flowchart of an image processing method according to another embodiment of the inventive concept. In the following description, parts of the image processing method of FIG. 8 which are the same as those described above with reference to FIGS. 1 to 7 will not be redundantly described again below. FIG. 8 illustrates an image processing method in which data is transmitted and received between the main device 100 and the subdevice 200 via the first communication network 300, and the method is described below in terms of the main device 100.

Referring to FIG. 8, the main device 100 and the subdevice 200 run a real-time video relaying application according to a user's selection (operation S810).

When the running of the real-time video relaying application is completed, the main device 100 starts connection to the subdevice 200 (operation S820). A method of starting connection to the subdevice 200, performed by the main device 100, is the same as that described above with reference to FIG. 7 and is thus not described again here.

When shooting is started, each of the main device 100 and the subdevice 200 captures a moving picture in real time (operation S830). The main device 100 may capture a moving picture (including first audio data and first video data) of an object at a location in real time. The subdevice 200 may capture a moving picture (including first audio data and first video data) of the object at one or more locations which are the same as or different from the location where the main device 100 captures the moving picture of the object.

The main device 100 converts the first video data included in the moving picture into second video data (operation S840).

The main device 100 receives second video data from the first to $N^{th}$ devices 200-1 to 200-N included in the subdevice 200 which starts the capturing of the moving picture simultaneously with the capturing of the moving picture by the main device 100 (operation S850).

The main device 100 displays the second video data converted form the first video data included in the moving picture captured by the main device 100 itself on a first display region (operation S860).

The main device 100 displays the second video data received from the first to $N^{th}$ devices 200-1 to 200-N on each of a plurality of subregions of a second display region different from the first display region (operation S870).

Here, a second video signal displayed on the first display region may be transmitted to the media platform 400 in real time. Furthermore, the second video data displayed on the first display region and the second video data displayed on the plurality of subregions of the second display region may be different in a frame rate. For example, second video data having a frame rate of 30 frames per second may be displayed on the first display region, and second video data having a frame rate of 15 frames per second may be displayed on the plurality of subregions of the second display region. Since the second video data received in real time from the first to N$^{th}$ devices 200-1 to 200-N is displayed on the plurality of subregions of the second display region, the main device 100 may control a second video signal of 30 frames per second to be displayed on the first display region with respect to the main device 100 and a second video signal of 15 frames per second to be transmitted with respect to the first to N$^{th}$ devices 200-1 to 200-N, simultaneously with transmission of a shooting start signal to the first to N$^{th}$ devices 200-1 to 200-N. Thus, the second video signal of 15 frames per second received from the first to N$^{th}$ devices 200-1 to 200-N may be displayed on the plurality of subregions of the second display region.

The main device 100 determines whether a subregion among the plurality of subregions is selected by a user (operation S880).

When it is determined that a subregion is selected, the main device 100 switches second video data displayed on the selected subregion to be displayed on the first display region (operation S890). When it is determined that a subregion is not selected, the second video data converted from the first video data included in the moving picture captured by the main device 100 is displayed on the first display region.

Here, when the second video data displayed on the selected subregion is switched to be displayed on the first display region, the main device 100 may transmit a control signal instructing to transmit second video data having a different frame rate to one of the first to N$^{th}$ devices 200-1 to 200-N which transmits the second video data to the selected subregion. That is, when the subregion is selected, a control signal instructing to transmit second video data having a frame rate of 30 frames per second may be transmitted to one of the first to N$^{th}$ devices 200-1 to 200-N which previously transmitted second video data having a frame rate of 15 frames per second. Furthermore, when the main device 100 switches second video data previously displayed on the first display region to be displayed on one of the plurality of subregions of the second display region, a control signal instructing to transmit second video data having a frame rate of 30 frames per second at a frame rate of 15 frames per second may be output.

The main device 100 encodes the second video data displayed on the first display region into an H.264 format, and encodes the first audio data, which is included in the moving picture captured by the main device 100, by using AAC (operation S900). Here, even if only the second video data is received from the subdevice 200 and displayed on the first display region, the same shooting start signal is recorded on the main device 100 and the subdevice 200. Thus, the second video data received from the subdevice 200 and the first audio data recorded by the main device 100 may be synchronous or almost synchronous with each other.

The main device 100 transmits encoded second video data displayed on the first display region and encoded first audio data to the media platform 400 via the second communication network 500 by using the RTMP (operation S910). Thus, the media platform 400 may reproduce the moving picture (including the second video data and the first audio data) transmitted in real time from the main device 100.

In an alternative embodiment, the main device 100 may provide a user interface for inserting a watermark in a state in which second video data is displayed on the first display region, and insert the watermark into the second video data displayed on the first display region according to a user's selection.

According to one or more of the above embodiments, video data and audio data captured by multiple devices may be transmitted to a mobile platform in real time without delay and thus the mobile platform may reproduce the video data and the audio data in real time.

Furthermore, a video signal captured by a subdevice among multiple devices may be transmitted to a main device without delay and without using a router, and the main device may relay video data and audio data to a mobile platform in real time and the mobile platform may reproduce the video data and the audio data in real time.

In addition, video signals captured by the main device and the subdevice may be displayed on a display region of the main device in real time to quickly determine video data to be transmitted to the mobile platform. Thus, the mobile platform may reproduce the video data and audio data in real time.

Effects of the inventive concept are not, however, limited to the above effects and other effects would be apparent to those of ordinary skill in the art from the above description.

The above-described embodiments may be embodied as a computer program that can be run through a computer using various elements. The computer program may be recorded on a non-transitory computer-readable recording medium. Examples of the non-transitory computer-readable recording medium may include a magnetic recording medium such as a hard disc, a floppy disk, a magnetic tape, etc., an optical recording medium such as a CD-ROM or a DVD, a magneto-optical medium such as a floptical disk, and a hardware device specifically configured to store and execute program commands, such as a ROM, a RAM, a flash memory, etc.

The computer program may be specially designed and configured for the inventive concept or may be well-known and available to those of ordinary skill in the computer software field. Examples of the computer program may include not only machine language codes prepared by a compiler, but also high-level language codes executable by a computer by using an interpreter.

In the present disclosure, the term "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein.

The operations of all methods described herein can be performed in an appropriate order unless otherwise indicated herein or otherwise clearly contradicted by context. The inventive concept is not limited by an order in which the operations are described herein. The use of any and all examples, or exemplary language (e.g., "such as") provided herein, is intended merely to clearly describe the inventive concept and does not pose a limitation on the scope of the inventive concept unless otherwise claimed. Numerous modifications and adaptations will be readily apparent to those skilled in this art without departing from the spirit and scope of the inventive concept.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. An image processing apparatus, comprising:
a main device configured to capture a moving picture including first audio data and first main video data of an object at a location; and
a plurality of subdevices connected to the main device through wireless communication, and including first to $N^{th}$ subdevices configured to convert first sub-video data of the object, which is captured at at least one location different from the location of the main device, into second sub-video data,
wherein the main device comprises a processor configured to:
convert the first main video data into second main video data;
display the second main video data converted from the first main video data on a first display region;
display one or more of the second sub-video data, without being encoded and decoded, received from the plurality of subdevices on a second display region different from the first display region, wherein the second display region is divided into at least one subregion;
switch the second sub-video data, displayed on a subregion selected according to a request to select one subregion, to be displayed on the first display region;
encode the second main video data displayed on the first display region and encode the first audio data; and
transmit the encoded second main video data displayed on the first display region and the encoded first audio data to outside,
wherein the second main video data is displayed on the first display region at a first frame rate and the one or more of the second sub-video data is displayed on the second display region at a second frame rate different from the first frame rate,
wherein, when switching, a control signal is transmitted to one of the plurality of subdevices corresponding to the second sub-video data displayed on the subregion selected according to the request to select the one subregion, and
wherein the control signal instructs the one of the plurality of subdevices to transmit the second sub-video data at the first frame rate to be displayed on the first display region.

2. The image processing apparatus of claim 1 wherein the processor of the main device is further configured to insert a received watermark into the second main video data displayed on the first display region.

3. The image processing apparatus of claim 1, wherein the processor of the main device is further configured to:
detect the first to $N^{th}$ subdevices in a range of the wireless communication; and
transmit a connection request signal requesting connection to the main device to the detected first to $N^{th}$ subdevices, and set starting of a connection between the main device and the first to $N^{th}$ subdevices transmitting a connection permission signal when receiving the connection permission signal from the first to $N^{th}$ subdevices.

4. The image processing apparatus of claim 3, wherein, when the setting of the starting of the connection is completed, the processor generates a same shooting start signal and transmits the same shooting start signal to the main device and the first to $N^{th}$ subdevices transmitting the connection permission signal.

5. A method of operating an image processing apparatus, performed by a main device, the image processing apparatus including the main device configured to capture a moving picture including first audio data and first main video data of an object at a location and a plurality of subdevices connected to the main device through wireless communication and including first to $N^{th}$ devices configured to convert first main video data of the object captured at at least one location different from the location of the main device into second sub-video data, the method comprising:
converting the first main video data into second main video data;
displaying the second main video data on a first display region, and displaying one or more of the second sub-video data, without being encoded and decoded, received from the plurality of subdevices on a second display region different from the first display region, wherein the second display region is divided into at least one subregion;
switching the second sub-video data, displayed on a subregion selected according to a request to select one subregion, to be displayed on the first display region;
encoding the second main video data displayed on the first display region and encoding the first audio data; and
transmitting the encoded second main video data displayed on the first display region and the encoded first audio data to outside,
wherein the second main video data is displayed on the first display region at a first frame rate and the one or more of second sub-video data is displayed on the second display region at a second frame rate different from the first frame rate,
wherein the switching further comprises transmitting a control signal to one of the plurality of subdevices corresponding to the second sub-video data displayed on the subregion selected according to the request to select the one subregion, and
wherein the control signal instructs the one of the plurality of subdevices to transmit the second sub-video data at the first frame rate to be displayed on the first display region.

6. The method of claim 5, further comprising inserting a received watermark into the second main video data displayed on the first display region.

7. The method of claim 5, further comprising:
detecting the first to $N^{th}$ subdevices in a radius of the wireless communication;
transmitting a connection request signal requesting connection to the main device to the detected first to $N^{th}$ subdevices;
receiving a connection permission signal from the first to $N^{th}$ subdevices; and
setting starting connection to the first to $N^{th}$ subdevices transmitting the connection permission signal.

8. The method of claim 7, further comprising, when the setting of the starting of the connection is completed, generating a same shooting start signal and transmitting the same shooting start signal to the main device and the first to $N^{th}$ subdevices transmitting the connection permission signal.

9. A computer program stored in a non-transitory computer-readable recording medium and configured to perform the method of claim 5 by using a computer.

10. A computer program stored in a non-transitory computer-readable recording medium and configured to perform the method of claim 6 by using a computer.

11. A computer program stored in a non-transitory computer-readable recording medium and configured to perform the method of claim 7 by using a computer.

12. A computer program stored in a non-transitory computer-readable recording medium and configured to perform the method of claim 8 by using a computer.

* * * * *